(No Model.)  2 Sheets—Sheet 1.
S. UREN.
SLOT MAKING ATTACHMENT FOR BOLT HEADING MACHINES.
No. 404,235. Patented May 28, 1889.
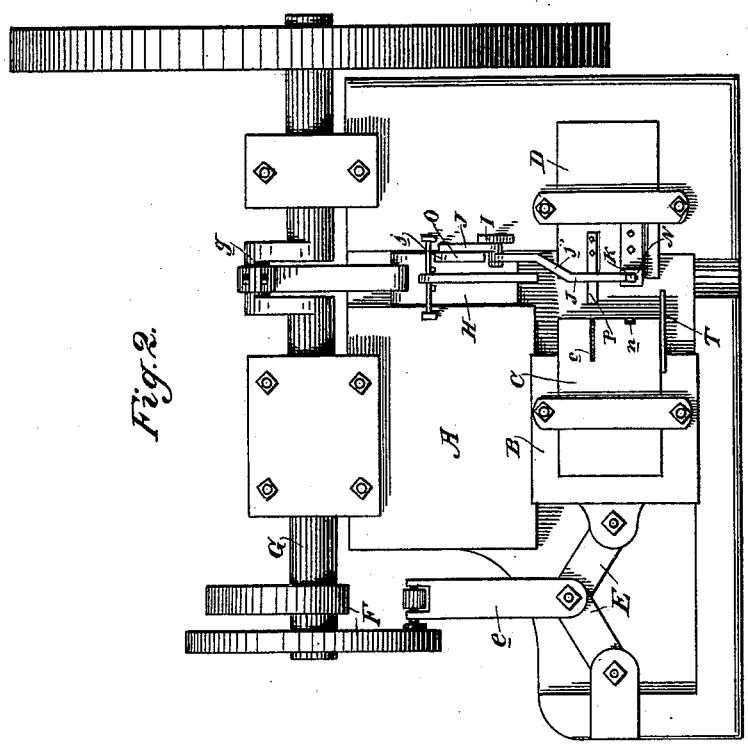
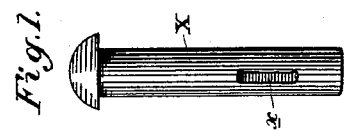
Witnesses,
Geo. H. Strong.
J. H. Nurse.
Inventor
Stephen Uren
By Dewey & Co
Attys (No Model.) 2 Sheets—Sheet 2.
S. UREN.
SLOT MAKING ATTACHMENT FOR BOLT HEADING MACHINES.
No. 404,235. Patented May 28, 1889.
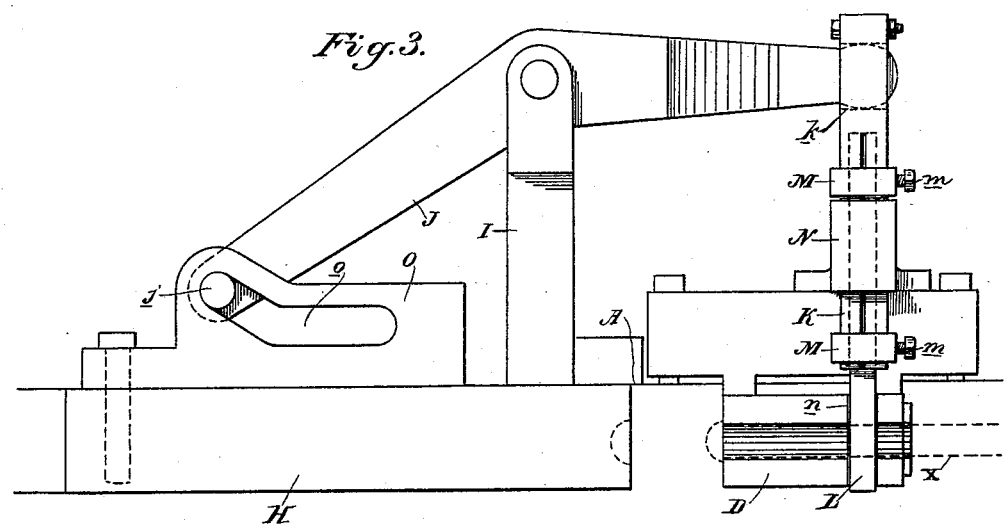
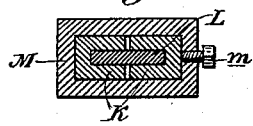
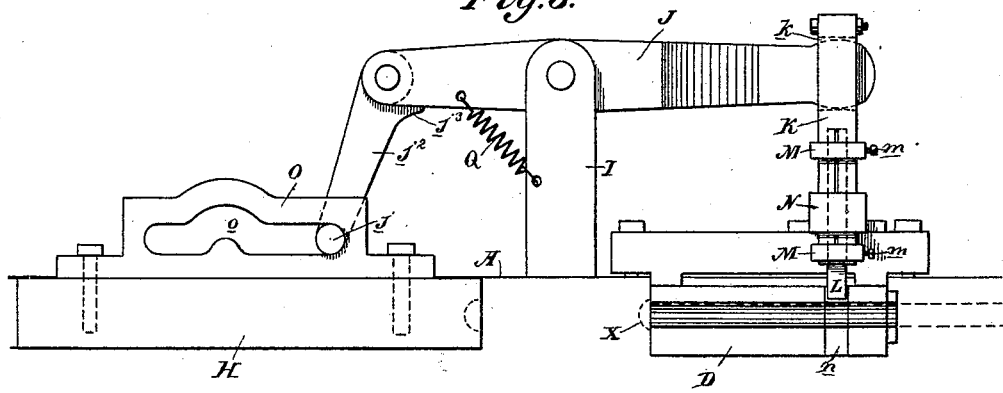
Witnesses,
Geo. H. Strong.
J. H. Nurse
Inventor,
Stephen Uren
By Dewey & Co.
Atty

UNITED STATES PATENT OFFICE.

STEPHEN UREN, OF SACRAMENTO, CALIFORNIA.

SLOT-MAKING ATTACHMENT FOR BOLT-HEADING MACHINES.

SPECIFICATION forming part of Letters Patent No. 404,235, dated May 28, 1889.

Application filed March 6, 1889. Serial No. 302,158. (No model.)

*To all whom it may concern:*

Be it known that I, STEPHEN UREN, of Sacramento, Sacramento county, State of California, have invented an Improvement in Slot-Making Attachments for Bolt-Heading Machines; and I hereby declare the following to be a full, clear, and exact description of the same.

My invention relates to that class of bolt-heading machines in which the bolt is confined and gripped between opposing dies, while a reciprocating plunger operates against the end of the bar and upsets it, so as to form the head of the bolt; and my invention consists in the hereinafter-described novel arrangement and combination of parts, whereby a slot or keyway is punched in the end of the bolt while it is clamped between the dies.

The object of my invention is to provide a simple and effective attachment for bolt-heading machines, whereby a slot or keyway may be formed in the end of the bolt at the same time that said bolt is being headed, so that but one operation is needed to head the bolt and make the slot or keyway in its end.

Referring to the accompanying drawings for a more complete explanation of my invention, Figure 1 is a view of a bolt, showing the keyway or slot in its end. Fig. 2 is a plan of a bolt-heading machine. Fig. 3 is a side elevation of my slot-making attachment. Fig. 4 is a cross-section of punch-holder and punch. Fig. 5 is a side elevation of a modification.

A is the frame or stand of the machine, having near one end the sliding carriage B, to which is clamped the movable die C, opposing which and fixed to the stand is the stationary die D. The carriage B is made to move back and forth by means of a toggle-lever, E, which has attached to it a connecting-rod, $e$, which is operated by eccentrics F upon the power-shaft G, all of these parts being the common and ordinary parts and mechanisms of a well-known bolt-heading machine.

H is the plunger which upsets the end of the bar as it is held between the dies, said plunger being reciprocated by a crank, $g$, on the power-shaft G, in the usual manner.

T is a cutter attached to the die C and adapted to cut off the bar into bolt-lengths.

The ordinary operation of a machine of this class is as follows: The bar from which the bolt is to be made is fed in between the dies, and thereupon the carriage moves inwardly, carrying its die C up, so that the bar is gripped tightly between the dies C and D, and then the plunger H advances and upsets the end of the bar forming the bolt-head. In order to provide for making a slot or keyway such as is shown by $x$, Fig. 1, in the end of the bolt X while it is clamped between the dies and undergoing the heading operation, I have the following construction:

I is a bracket secured to the frame of the machine, and having pivoted in its top the punch-operating lever J. The forward end of this lever engages the slotted top $k$ of the punch-holder K. This punch-holder consists of two grooved opposing bars, between which and in the grooves of which the punch-strip L is clamped and held by means of the clamps M, encircling the holder-strips and held by set-screws $m$. This punch passes down through apertures $n$, made in the tops of the dies, so as to come in contact with and pass through the bolt, which is then gripped between the dies, and said punch-holder is guided in its vertical movement by a suitable guide, N, on the frame of the machine.

The rear end of the lever J is provided with a pin or stud, $j$, which engages a cam slot or groove, $o$, in a bracket, O, which is securely fastened to the reciprocating plunger H of the machine. The cam-groove of this bracket is provided with a forwardly-extending horizontal portion and a backwardly-extending and upwardly-inclined portion, as shown. The bracket O is bolted to the top of the plunger to one side thereof, in order to avoid interference with other parts not herein necessary to describe, and the lever J is carried sidewise at its fulcrum-center, and is offset also at $j'$, in order to get its other end into position to engage the punch.

P is the usual bolt-releasing arm, secured to the fixed die D, and having flanges which enter and play in slots $c$ in the movable die C.

The operation of the punch attachment is as follows: When the dies C and D are fully separated, the bar is fed between them and the power-shaft G rotated. The first effect is to cause the movable die C to come up to the bar and to grip it between it and the fixed die D. The plunger H at the same time is advancing, but the punch L is elevated, being held in this position by the engagement of the pin $j$ of its lever J with the horizontal portion of the cam-groove $o$. This position of the punch continues while the pin travels in said horizontal portion; but as soon as the inclined portion of the groove $o$ is reached and the pin enters it the rear end of the lever J is thereby thrown up, so that the punch L is moved down, and as the bar is fully gripped by the dies and the plunger upsets its end the punch is moved down upon the bar and passes through it, forming the slot or keyway in its end. When the plunger H begins to move back, the punch is immediately withdrawn from the bolt, and then the dies release the bolt, which is discharged by means of the usual flanged plate, P, entering the slots in the movable die.

I do not confine myself to the exact shape of the cam-groove $o$ heretofore described, nor to the connection of lever J therewith, for, as shown in Fig. 5, I may modify these parts without altering the principle of my invention, as follows: The lever J in this case is straight and has pivoted to its rear end a connecting-link, $j^2$, which has a stop-lip, $j^3$, which limits the movement of the link in one direction. The lower end of the link has the pin $j$, which engages a cam-groove in bracket O of the shape shown, having two horizontal portions with an intervening raised portion. A spiral spring, Q, keeps the lever J steady. Now, when the plunger comes forward, the pin $j$, being engaged by the straight front portion of the cam-groove, has no effect upon the lever J, which remains steady; but as soon as the raised portion of the cam-groove reaches the pin the link $j^2$ is raised, and, being limited by its stop-lip $j^3$, raises the rear end of lever J, so that its forward end forces down the punch. Then the rear straight portion of the cam-groove, acting on the pin, pulls the punch up again.

On the return movement of the plunger the cam-groove has no effect, as the link swings freely in that direction.

Having thus described my invention, what I claim as new, and desire to secure by Letters Patent, is—

1. In a bolt-heading machine, and in combination with the opposing dies for gripping and holding the bar, and the reciprocating plunger for upsetting its end to form the head of the bolt, a vertically-movable punch, L, adapted to make a slot or keyway in the end of the bolt, a pivoted lever engaging the upper end of the punch for operating it, a bracket secured to the reciprocating plunger, and having a cam-groove and connections between the rear end of the lever and the cam-groove, whereby said lever is operated, substantially as described.

2. In a bolt-heading machine, and in combination with the opposing dies for gripping and holding the bar, and the reciprocating plunger for upsetting its end to form the head of the bolt, a vertically-movable punch, L, adapted to make a slot or keyway in the end of the bolt, a pivoted lever engaging the upper end of the punch for operating it, said lever having at its other end a pin or stud, and a bracket on the reciprocating plunger provided with a cam-groove having a horizontal and an inclined portion, as described, and with which the pin of the lever engages, substantially as described.

3. In a bolt-heading machine, and in combination with the opposing dies for gripping and holding the bar, and the reciprocating plunger, whereby the end of the bar is upset to form the head of the bolt, in combination with the punch-strip L, for making a slot or keyway in the end of the bolt, the grooved holding-bars K for said punch, and the clamps M, with set-screws for the holding-bars, the pivoted lever J, the forward end of which engages the holder of the punch, said lever having a pin, $j$, at its rear end, and the bracket on the reciprocating plunger, having a cam-groove, $o$, as described, engaging the pin of the lever, whereby said lever is operated, substantially as described.

In witness whereof I have hereunto set my hand.

STEPHEN UREN.

Witnesses:
C. N. POST,
T. J. DUNWORTH.